July 29, 1924.
W. JANUS
MALLEABLE SUPPORT BRACKET
Filed Jan. 14, 1924
1,502,826
2 Sheets-Sheet 2
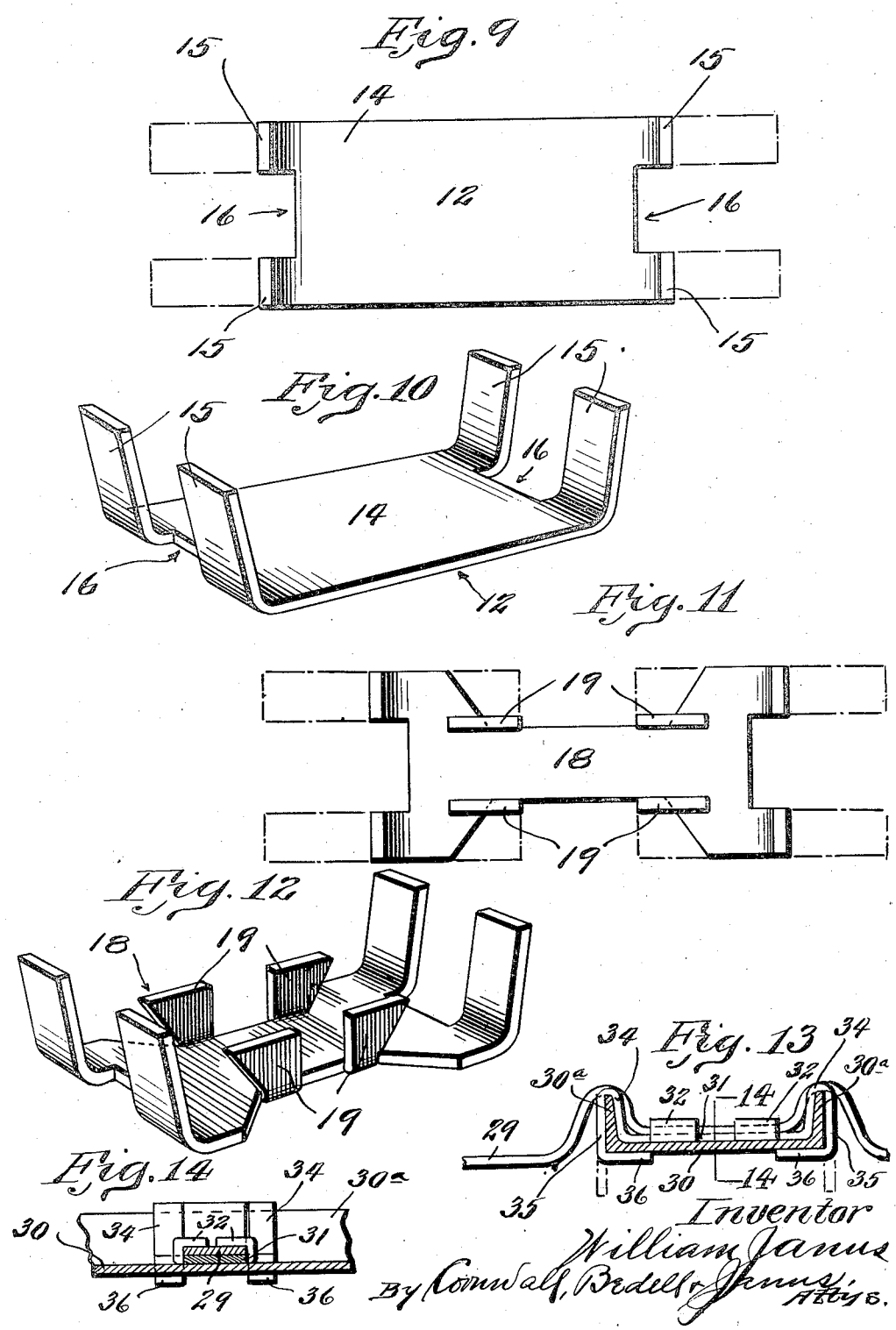

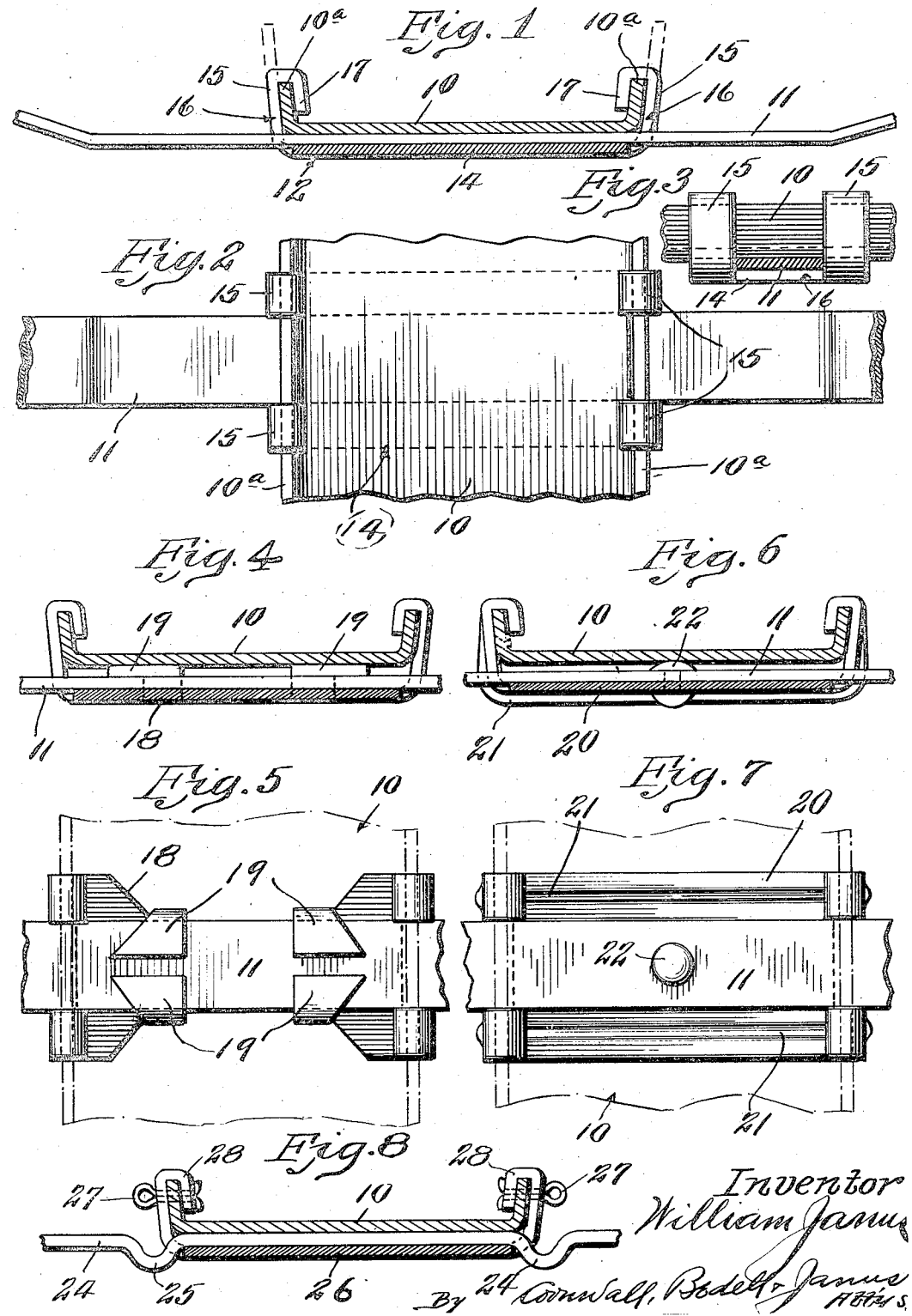

Patented July 29, 1924.

1,502,826

UNITED STATES PATENT OFFICE.

WILLIAM JANUS, OF ST. LOUIS COUNTY, MISSOURI, ASSIGNOR TO CHICAGO RAILWAY EQUIPMENT COMPANY, OF CHICAGO, ILLINOIS, A CORPORATION OF ILLINOIS.

MALLEABLE SUPPORT BRACKET.

Application filed January 14, 1924. Serial No. 686,167.

*To all whom it may concern:*

Be it known that I, WILLIAM JANUS, a citizen of the United States, residing at St. Louis County, Missouri, have invented a certain new and useful Improvement in Malleable Support Brackets, of which the following is a specification, such as will enable others skilled in the art to which it appertains to make and use the same.

This invention relates to new and useful improvements in support brackets for track or spring members of third or fourth point supports.

The objects of the invention are to provide a support bracket which is of simple construction, can be easily attached to the spring plank of the car truck without the use of any fastening devices or any other extraneous attaching means, and which, when placed in position, will efficiently hold the spring or track member in position.

Further objects of the invention are to provide a support bracket which may be easily secured to the track or spring member and which is adapted to be applied to the car truck by means of extensions or portions carried by said bracket and designed to be bent over and engage portion of a member of said car truck.

Still further objects of the invention are to provide a support bracket which can be manufactured at low cost and is adapted to be secured to the track member at the factory, thereby reducing the cost of attaching the track member in position, and to provide a bracket which is inexpensive to manufacture so that it may be discarded with the track member when the latter is broken or replaced for other reasons without increasing the cost of replacement.

With these and other objects in view, my invention consists in certain novel features of construction and arrangement of parts, hereinafter more fully described and claimed, and illustrated in the accompanying drawings, in which—

Figure 1 is a cross section taken transversely through the spring plank and showing the support bracket in position thereon.

Figure 2 is a top plan view of Figure 1.

Figure 3 is an end elevational view of the support bracket showing the spring member in section.

Figure 4 is a transverse cross section of the spring plank showing a modified form of the support bracket.

Figure 5 is a top plan view of the form shown in Figure 4, with the spring plank shown in dotted lines.

Figure 6 is a cross sectional view of a still further modified form of a support bracket.

Figure 7 is a plan view of the form shown in Figure 6 with the spring plank shown in dotted lines.

Figure 8 is a cross sectional view of the spring plank and the support bracket and showing the latter locked in position on said spring plank.

Figure 9 is a plan view of the support bracket illustrated in Figures 1 to 3.

Figure 10 is a perspective detail view of said bracket before being attached to the spring plank.

Figure 11 is a top plan view of the support bracket illustrated in Figures 4 and 5.

Figure 12 is a perspective detail view of same.

Figure 13 is a detail view of a modified form in which the spring member is supported above the spring plank.

Figure 14 is a cross sectional view taken on line 14—14 of Figure 13.

Referring by numerals to the accompanying drawings and particularly to Figures 1 to 3 inclusive, 10 indicates a spring plank which forms part of the car truck construction. 11 is the spring track member used in connection with third or fourth point supports for brake rigging and 12 is the support bracket which is fixed to the spring plank and supports spring member 11 in position. This bracket comprises a flat body portion 14 which engages spring member 11 and holds it against the underside of spring plank 10 and extensions 15 which extend longitudinally from said body portion and are spaced from each other to form recesses or seats 16 for the accommodation of spring or track member 11.

To secure bracket 12 to spring plank 10, portions 15 are bent upwardly as indicated by dotted lines in Figure 1 and lie snugly against the outer sides of flanges 10$^a$ of spring plank 10. The extreme ends of portions 16 are then bent or hammered inwardly over the edges of said flanges and then downwardly against the inside faces of flanges 10$^a$ as indicated at 17. In hammering extremities of portions 15 over the flanges of the spring plank, the body portion 14 is drawn toward the spring plank 10 and the track member 11 is thus clamped between said spring plank and said body portion and is firmly held in position.

In the forms shown in Figures 4 and 5, bracket 18 is provided with laterally disposed ears or extensions 19 which are adapted to be hammered or bent over the track member 11 and secure said bracket to said track member. In this manner the support bracket may be secured to the track member at the factory, thereby reducing the time and labor required to attach the track member in position on the car truck.

In the forms shown in Figures 6 and 7 the support bracket 20 is provided with a series of reinforcing ribs 21 and the track member 11 is secured to said bracket by means of a rivet 22.

In Figure 8 a bracket 26 is locked in position on the spring plank 10 by means of cotter pins 27 which pass through apertures formed in the flanges of the spring plank and in extensions 28 of bracket 26. A track member 24 is shown provided with transversely disposed shoulders or depressions 25 which abut the ends of bracket 26 and prevent the longitudinal displacement of said track member.

In the forms heretofore described, the track member is designed to be located under the spring plank. In the forms shown in Figures 13 and 14 a track member 29 is located above spring plan 30 and is held in position thereon by a bracket 31. This bracket is provided with lateral ears 32 for engaging the track member 29 and securing the bracket thereto. Extensions 34 of bracket 31 are bent upwardly to lie against the inner faces of flanges 30ᵃ and are then bent outwardly and downwardly as indicated at 35 to lie against the outer sides of said flanges. The extreme ends of said extensions are then hammered inwardly against the underside of spring plank 30 as indicated at 36 so that said bracket and track member 29 are firmly held in position on spring plank 30.

A support bracket of my improved construction is preferably formed from a single piece and can be secured in position on the car truck without the use of extraneous fastening devices by bending or hammering extensions of said bracket over portions of a car truck member. Thus the cost of manufacture and installation is reduced to minimum and the bracket is easily adaptable to spring planks of various designs and dimensions. Furthermore by means of my improved bracket the spring or truck member may be attached in position on the car truck without the necessity of drilling or otherwise perforating or mutilating the spring plank or the track member.

While I have shown and described the preferred forms of my improved bracket, it is obvious that various changes may be made in the construction of the bracket, without departing from the spirit of the invention.

I claim:

1. A support bracket for third or fourth point support members provided with extensions adapted to be bent or hammered to partially embrace a portion of a car truck member and secure said bracket in position.

2. A support bracket for brake gear support members adapted to be secured to a part of a car truck by having its portions formed to engage portions of a car truck member.

3. A support bracket for brake gear support members having extensions formed integrally therewith, said extensions being adapted to be bent to form supporting engagement with a portion of a car truck.

4. A support bracket comprising a body portion adapted to receive and engage a support member for brake rigging, and extensions formed integral with said body portion and adapted to be bent and partially embrace a portion of a car truck member.

5. A support bracket comprising a body portion adapted to receive and support a brake gear support member and having portions extending from said body portion and adapted to partially embrace a car truck member and secure said bracket thereto.

6. In a car truck construction, the combination with a brake gear support member, of a support bracket secured to said member and adapted to be detachably secured to a part of the car truck.

7. In a car truck construction, the combination with a brake gear support member, of a support bracket secured to said member and provided with extensions adapted to be bent over portions of a car truck member to secure said bracket in position.

8. In a car truck construction, the combination with a brake gear support member, of a support bracket, means for attaching said bracket to said member, and extensions formed integral with said bracket and adapted to engage portions of a car truck member.

9. A support bracket of the class described comprising a body portion and extensions formed integral with said body portion and adapted to be bent over a part of a car truck to secure said bracket in position thereon.

10. A support bracket of the class described comprising a rigid body portion and pliable end portions, said end portions being adapted to be bent over a part of a car truck and secure said bracket in position.

11. A support bracket of the class described comprising a body portion for engaging a brake beam support member, and end portions adapted to be bent over and secured to a part of a car truck, said end portions being bifurcated to straddle the brake beam support member.

12. A support bracket of the class described comprising a body portion, transversely disposed ears formed integral with said body portion and adapted to be bent to engage a brake gear support member and secure said bracket thereto, and end portions formed integral with said body portion and adapted to be bent to engage portions of a car truck member and detachably secure said bracket and said brake gear support member in position.

In testimony whereof I hereunto affix my signature this 17th day of December, 1923.

WILLIAM JANUS.